US006933942B2

(12) United States Patent
Tamai

(10) Patent No.: US 6,933,942 B2
(45) Date of Patent: Aug. 23, 2005

(54) DISPLAY APPARATUS IN WHICH RECOVERY TIME IS SHORT IN FAULT OCCURRENCE

(75) Inventor: Junichi Tamai, Ehime (JP)

(73) Assignee: NEC Corporation, Tokyo (JP)

(*) Notice: Subject to any disclaimer, the term of this patent is extended or adjusted under 35 U.S.C. 154(b) by 176 days.

(21) Appl. No.: 10/195,737

(22) Filed: Jul. 16, 2002

(65) Prior Publication Data

US 2003/0016224 A1 Jan. 23, 2003

(30) Foreign Application Priority Data

Jul. 19, 2001 (JP) ....................................... 2001/219890

(51) Int. Cl.[7] ................................................ G06F 15/80

(52) U.S. Cl. ........................ 345/505; 345/502; 345/504; 712/10; 712/11; 712/28

(58) Field of Search ................................ 345/502, 504, 345/505, 506; 712/10, 11, 28

(56) References Cited

U.S. PATENT DOCUMENTS 5,437,464 A * 8/1995 Terasima et al. .............. 463/43
5,455,601 A * 10/1995 Ozaki .......................... 345/156
5,872,872 A * 2/1999 Kajiwara .................... 382/296

FOREIGN PATENT DOCUMENTS

| | | | | |
|---|---|---|---|---|
| JP | 5-173941 A | 7/1993 | | |
| JP | 9-50533 A | 2/1997 | | |
| JP | H09-204164 A | 8/1997 | | |
| JP | 2000-29456 A | 1/2000 | | |
| JP | 2000-99712 A | 4/2000 | | |
| JP | 2000-172482 A | 6/2000 | | |
| JP | 2000-267651 A | 9/2000 | | |
| JP | 2001349840 A | * 12/2001 | .......... | G01N/21/88 |

* cited by examiner

*Primary Examiner*—Matthew C. Bella
*Assistant Examiner*—Mackly Monestime
(74) *Attorney, Agent, or Firm*—Sughrue Mion, PLLC

(57) ABSTRACT

In a display apparatus, a display instruction generating unit outputs a display instruction. A plurality of display processing units are arranged in parallel, and each of the plurality of display processing units generates display data in response to the display instruction from the display instruction generating unit. A display switching unit selects one of the plurality of display processing units and outputs the display data from the selected display processing unit to the display unit. Thus, a display unit displays the display data.

20 Claims, 7 Drawing Sheets

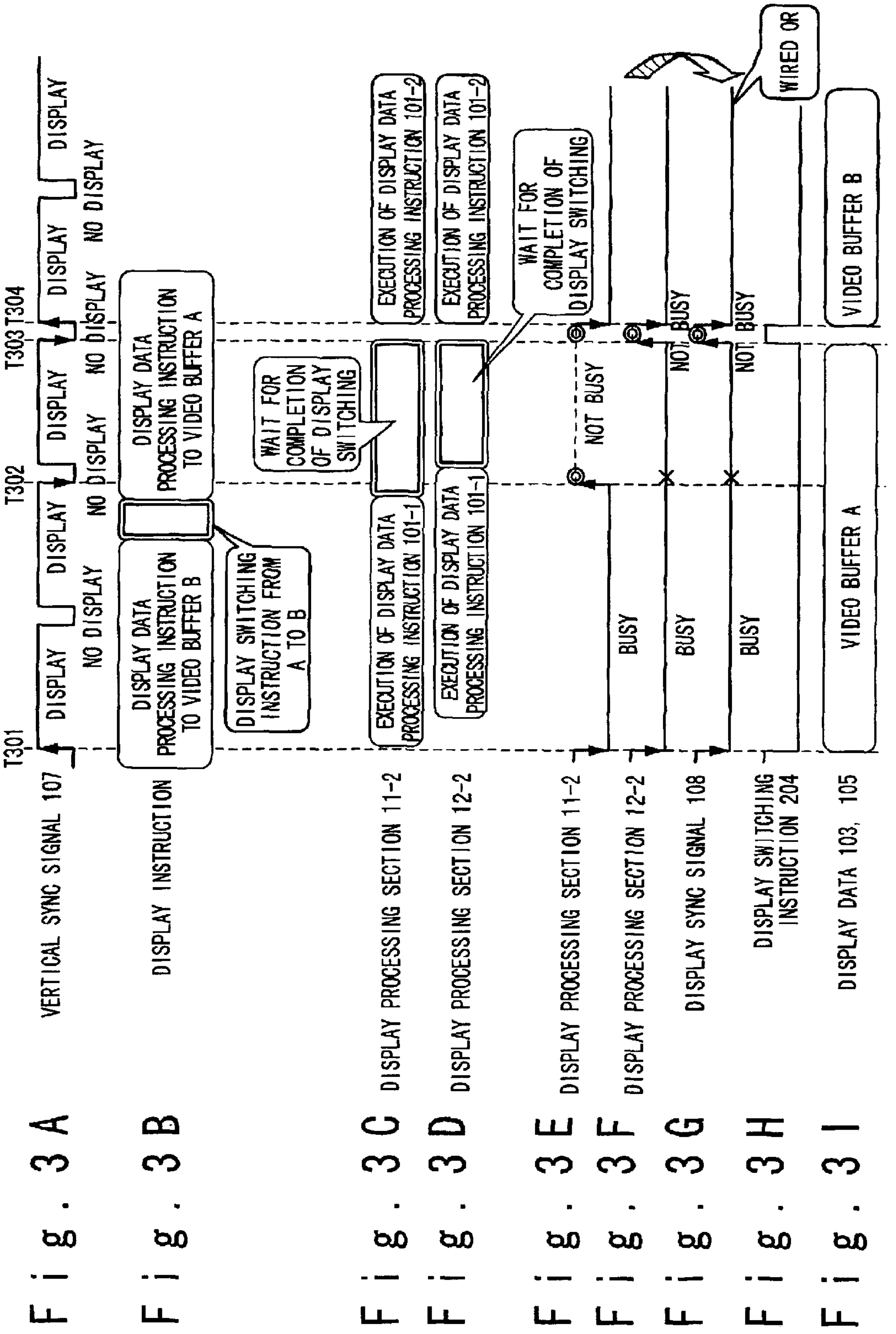
Fig. 3A
Fig. 3B
Fig. 3C
Fig. 3D
Fig. 3E
Fig. 3F
Fig. 3G
Fig. 3H
Fig. 3I
VERTICAL SYNC SIGNAL 107
DISPLAY INSTRUCTION
DISPLAY PROCESSING SECTION 11-2
DISPLAY PROCESSING SECTION 12-2
DISPLAY PROCESSING SECTION 11-2
DISPLAY PROCESSING SECTION 12-2
DISPLAY SYNC SIGNAL 108
DISPLAY SWITCHING INSTRUCTION 204
DISPLAY DATA 103, 105
T301
T302
T303
T304
DISPLAY
NO DISPLAY
DISPLAY DATA PROCESSING INSTRUCTION TO VIDEO BUFFER B
DISPLAY DATA PROCESSING INSTRUCTION TO VIDEO BUFFER A
DISPLAY SWITCHING INSTRUCTION FROM A TO B
WAIT FOR COMPLETION OF DISPLAY SWITCHING
EXECUTION OF DISPLAY DATA PROCESSING INSTRUCTION 101-1
EXECUTION OF DISPLAY DATA PROCESSING INSTRUCTION 101-2
WAIT FOR COMPLETION OF DISPLAY SWITCHING
BUSY
NOT BUSY
WIRED OR
VIDEO BUFFER A
VIDEO BUFFER B

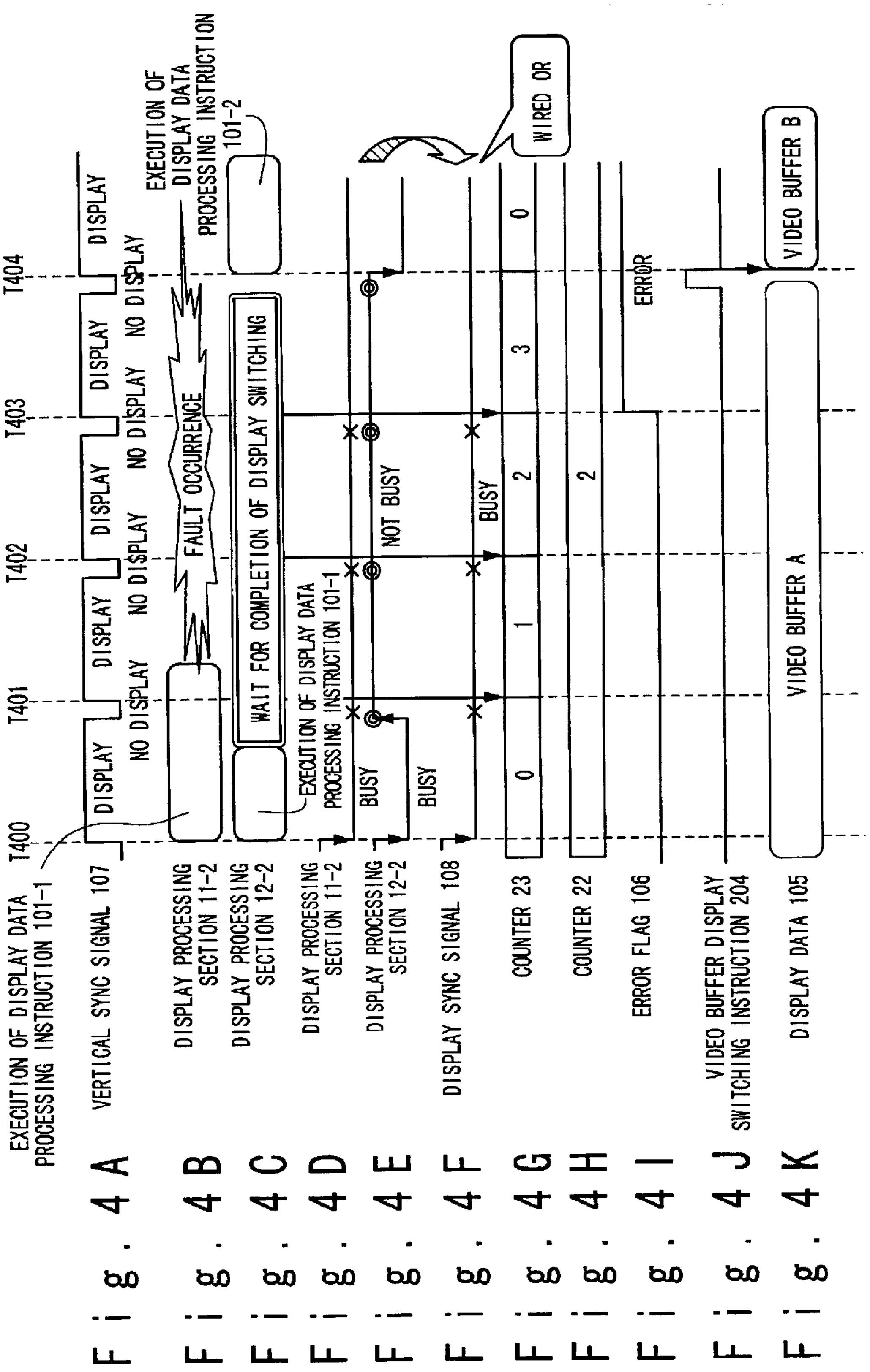
Fig. 4A EXECUTION OF DISPLAY DATA PROCESSING INSTRUCTION 101-1
VERTICAL SYNC SIGNAL 107
Fig. 4B DISPLAY PROCESSING SECTION 11-2
Fig. 4C DISPLAY PROCESSING SECTION 12-2
Fig. 4D DISPLAY PROCESSING SECTION 11-2
Fig. 4E DISPLAY PROCESSING SECTION 12-2
Fig. 4F DISPLAY SYNC SIGNAL 108
Fig. 4G COUNTER 23
Fig. 4H COUNTER 22
Fig. 4I ERROR FLAG 106
Fig. 4J VIDEO BUFFER DISPLAY SWITCHING INSTRUCTION 204
Fig. 4K DISPLAY DATA 105
T400
T401
T402
T403
T404
DISPLAY
NO DISPLAY
FAULT OCCURRENCE
EXECUTION OF DISPLAY DATA PROCESSING INSTRUCTION 101-2
WAIT FOR COMPLETION OF DISPLAY SWITCHING
EXECUTION OF DISPLAY DATA PROCESSING INSTRUCTION 101-1
BUSY
NOT BUSY
WIRED OR
0
1
2
3
ERROR
VIDEO BUFFER A
VIDEO BUFFER B

DISPLAY APPARATUS IN WHICH RECOVERY TIME IS SHORT IN FAULT OCCURRENCE

BACKGROUND OF THE INVENTION

1. Field of the Invention

The present invention relates to a display apparatus which displays data such as graphic data, and more particularly to a display apparatus which a can be recovered quickly from a trouble when a fault has occurred.

2. Description of the Related Art

A conventional display apparatus has a display processing unit which generates display data and outputs it to a display unit. As a method of recovering the display apparatus when some fault occurs in the above-mentioned display processing unit, there would be a method of restarting an application and a method of manually replacing the display processing unit in which the fault has occurred, into a new display processing unit by an operator.

However, in the above-mentioned conventional example, when the fault has occurred in the display processing unit, the recovery of the display processing apparatus takes a long time. Therefore, data cannot be displayed from the occurrence of the fault to the recovery of the display apparatus.

Also, when the recovery of the display processing unit cannot be expected and the display apparatus needs to be manually replaced to a new display apparatus by the operator, the recovery of the system takes a long time.

In conjunction with the above description, an image processing apparatus using distributed frame memories of a parallel computer is disclosed in Japanese Laid Open Patent application (JP-A-Heisei 5-173941). The image processing apparatus is comprised of a plurality of processing units, distributed frame memories provided to store image data for every processing unit, and a display unit which outputs a display sync signal for the display in a screen to the distributed frame memories and which displays the image data transferred from each distributed frame memory on the screen. The distributed frame memories are connected in series and a transfer bus transfers the image data to the display unit in order. A display frame memory is provided between the display unit and each distributed frame memory. In the display frame memory, a transfer request section issues an image data transfer request to each distributed frame memory based on a display sync signal which is outputted from the display unit. The frame memory section stores image data transferred from each distributed frame memory through the transfer bus in response to the transfer request from the transfer request section for one frame. The memory control unit controls the read and write of each image data to the frame memory section. The memory control unit takes synchronization of the read timing of each image data with the timing of the display sync signal when each image data is read out from the frame memory section.

Also, a graphic display unit is disclosed in Japanese Laid Open Patent application (JP-A-Heisei 9-50533). In this reference, the generation of the noise caused due to a previous un-processed command in a frame buffer switched to a new display mode is prevented while a mode switching period by a mode switching section is kept constant. In the graphic display unit, a display section generates pixel data based on a display command from a host processing unit. A pair of frame buffers stores the pixel data generated by the display section. A display section displays the pixel data stored in the frame buffer. A mode switching section switches the frame buffers to the modes which are different each other between a display mode to write the pixel data from the display section and a display mode which outputs the written pixel data to the display section. A reset section is provided to stop the generation operation of the pixel data by the display section and an operation signal to the mode switching section is used as a reset signal the reset section.

Also, a display apparatus is disclosed in Japanese Laid Open Patent Application (JP-P2000-29456A). In this reference, the display apparatus is comprised of a graphic display section which has a double buffer, a display control unit which carries out branch processing such as display data generation processing, write processing to the double buffer, and a screen switch processing, a register which stores elapsed time from the time of the screen switching which is carried out in synchronism with a vertical sync signal, and a table in which a processing content corresponding to each of time ranges is set. The elapsed time is acquired from the register every frame when the display processing ends, and divided into the time ranges. The display control processing acquires the elapsed time from the register at the end of the display processing and stores the processing contents corresponding to the elapsed time in the table, precedes in the display data generation of the next frame when the elapsed time exceeds a time limit in which delay is taken into account by a predetermined value. In a real time animation display, it is prevented that the display processing is delayed due to high load Also, a display apparatus is disclosed in Japanese Laid Open Patent Application (JP-P2000-172482A). The display unit in this reference is comprised of a computer system of at least 2 systems which control an image signal, a switching section which switches the computer systems, and a display section which displays a screen based on the image signal transmitted by the switched computer system. Each computer system is comprised of a display storage section which stores the image signal to transmit to the display section. The switching section reads the image signal stored in the display storage section for the display section to display the data. When the computer system transmitting the image signal is breaks down, the display storage section belonging to the broken-down computer system is compulsorily stopped in the update of the memory contents, until the switching section switches the other computer system to the display section after the processing for handing over of the image signal to the other switched computer system end. The display section displays the screen corresponding to the image signal before the computer system broke down.

Also, a parallel display apparatus is disclosed in Japanese Laid Open Patent Application (JP-P2000-267651A). In this reference, a display instruction and data generating mechanism distributes a display instruction and data to the display apparatus in units of screens to a window for the display content to be changed. Each display apparatus carries out a display operation to a display memory in the display apparatus in accordance with the display instruction and the data. The content of the display memory is read out in response to a signal synchronized with the scan of a display 7 outputted from the display control. A window number of the window displayed at present is outputted from a window number buffer. A unit number of the display unit which outputs the latest display data for the window with the above window number is outputted from a window number and display unit management table. The display switching unit selects display data from the display unit with the unit number.

SUMMARY OF THE INVENTION

Therefore, an object of the present invention is to provide a display apparatus which can be quickly recovered when some fault occurs.

In an aspect of the present invention, a display apparatus includes a display unit, a display instruction generating unit which outputs a display instruction, a plurality of display processing units and a display switching unit. The plurality of display processing units are arranged in parallel, and each of the plurality of display processing units generates display data in response to the display instruction from the display instruction generating unit. The display switching unit selects one of the plurality of display processing units and outputs the display data from the selected display processing unit to the display unit. Thus, the display unit displays the display data.

In this case, each of the plurality of display processing units may include a plurality of video buffers, generate the display data in response to a display data processing instruction contained in the display instruction, store the display data in one of the plurality of video buffers, carry out a video buffer switching process to select one of the plurality of video buffers based on the video buffer switching instruction contained in the display instruction and output the display data from the selected video buffer to the display switching unit.

When the plurality of display processing units are connected with a display sync signal, each of plurality of display processing units may determine based on the display sync signal whether all of the plurality of display processing units acknowledge the video buffer switching instruction.

In this case, each of the plurality of display processing units may output an error flag when the display sync signal indicates that any of the plurality of display processing units does not acknowledge the video buffer display switching instruction during a predetermined time. The display switching unit selects one of the display processing units which output the error flags, and outputs the display data from the selected display processing unit to the display unit.

In this case, the display processing unit may carry out the video buffer switching process irrespective of the indication of the display sync signal, while outputting the error flag to the display switching unit.

Also, the display apparatus may further include a vertical synchronization signal generating unit which generates a vertical sync signal. The display switching unit selects one of the plurality of display processing units in synchronism with the vertical sync signal.

In this case, each of the plurality of display processing units may include a counter and a reference counter. The counter is counted up in synchronism with the vertical sync signal, when the display sync signal indicates that the other display processing unit does not acknowledge the video buffer switching instruction during the predetermined time. A predetermined value is set in the reference counter. Thus, the display processing unit determines based on the comparison result of the value of the reference counter and the value of the counter whether the predetermined time passed.

Also, each of the plurality of display processing units may output an error flag when the display sync signal indicates that any of the plurality of display processing units does not acknowledge the video buffer display switching instruction during a predetermined time. The display apparatus may further include a display sync signal processing unit which determines based on the error flags from the plurality of display processing units that a fault has occurred in any of the plurality of display processing units, and outputs a display switching instruction to the display switching unit. The display switching unit selects one of the display processing units which output the error flags, and outputs the display data from the selected display processing unit to the display unit.

In this case, the display sync signal processing unit disconnects the display sync signal from the display processing unit in which the fault has occurred.

Also, the display sync signal processing unit may include light emitting devices which notify the display processing unit in which the fault has occurred.

Also, when the display processing units are connected with the display sync signal, the display apparatus may further include a display sync signal processing unit which determines that a fault has occurred in any of the plurality of display processing units, when the display sync signal indicates that any of the plurality of display processing units does not acknowledge the video buffer switching instruction during a predetermined time, and which outputs a display switching instruction to the display switching unit. The display switching unit selects one of the display processing units which output the error flags, and outputs the display data from the selected display processing unit to the display unit.

In this case, the display sync signal processing unit may disconnect the display sync signal from the display processing unit in which the fault has occurred.

Also, the display sync signal processing unit may include light emitting devices which notify the display processing unit in which the fault has occurred.

In this case, the display apparatus may further include a vertical synchronization signal generating unit which generates a vertical sync signal. The display switching unit selects one of the plurality of display processing units in synchronism with the vertical sync signal.

In this case, the display sync signal processing unit may include a counter and a reference counter. The counter is counted up in synchronism with the vertical sync signal, when the display sync signal indicates that the other display processing unit does not acknowledge the video buffer switching instruction during the predetermined time. A predetermined value is set in the reference counter. The display sync signal processing unit determines based on the comparison result of the value of the reference counter and the value of the counter whether the predetermined time passed.

In another aspect of the present invention, a display apparatus may include a display unit, a display instruction generating unit which outputs a display instruction, a plurality of display processing units, a vertical synchronization signal generating unit and a display switching unit. The plurality of display processing units are connected with a display sync signal. Each of the plurality of display processing units may include a plurality of video buffers, generate the display data in response to a display data processing instruction contained in the display instruction, store the display data in one of the plurality of video buffers, carry out a video buffer switching process to select one of the plurality of video buffers based on the video buffer switching instruction contained in the display instruction, output the display data from the selected video buffer, and output an error flag when the display sync signal indicates that any of the plurality of display processing units does not acknowledge the video buffer display switching instruction during a predetermined time. The vertical synchronization signal generating unit generates a vertical sync signal. The display switching unit selects one of the plurality of display processing units in synchronism with the vertical sync signal in a normal state, selects one of the plurality of display processing units outputting the error flags in synchronism with the vertical sync signal when it is determined from the error flags that a fault has occurred in any of the plurality of display processing units, and outputs the display data from the selected display processing unit to the display unit. The display unit displays the display data.

In this case, each of the plurality of display processing units may include a counter and a reference counter. The counter is counted up in synchronism with the vertical sync signal, when the display sync signal indicates that the other display processing unit does not acknowledge the video buffer switching instruction during the predetermined time. A predetermined value is set in the reference counter. The display processing unit determines based on the comparison result of the value of the reference counter and the value of the counter whether the predetermined time passed.

In another aspect of the present invention, a display apparatus includes a display unit, a display instruction generating unit which outputs a display instruction, a plurality of display processing units, a display sync signal processing unit, a vertical synchronization signal generating unit, and a display switching unit. The plurality of display processing units are connected with a display sync signal. Each of the plurality of display processing units includes a plurality of video buffers, generates the display data in response to a display data processing instruction contained in the display instruction, stores the display data in one of the plurality of video buffers, carries out a video buffer switching process to select one of the plurality of video buffers based on the video buffer switching instruction contained in the display instruction, outputs the display data from the selected video buffer, and outputs an error flag when the display sync signal indicates that any of the plurality of display processing units does not acknowledge the video buffer display switching instruction during a predetermined time. The display sync signal processing unit determines based on the error flags from the plurality of display processing units that a fault has occurred in any of the plurality of display processing units, and outputs a display switching instruction to the display switching unit. The vertical synchronization signal generating unit generates a vertical sync signal. The display switching unit selects one of the plurality of display processing units in synchronism with the vertical sync signal in a normal state, selects one of the plurality of display processing units which output the error flags, in synchronism with the vertical sync signal in response to the display switching instruction and outputs the display data from the selected display processing unit to the display unit, wherein the display unit displays the display data.

In this case, each of the plurality of display processing units may include a counter and a reference counter. The counter is counted up in synchronism with the vertical sync signal, when the display sync signal indicates that the other display processing unit does not acknowledge the video buffer switching instruction during the predetermined time. A predetermined value is set in the reference counter. The display processing unit determines based on the comparison result of the value of the reference counter and the value of the counter whether the predetermined time passed.

In another aspect of the present invention, a display apparatus includes a display unit, a display instruction generating unit which outputs a display instruction, a plurality of display processing units, a display sync signal processing unit, a vertical synchronization signal generating unit and a display switching unit. The plurality of display processing units connected with a display sync signal. Each of the plurality of display processing units includes a plurality of video buffers, generates the display data in response to a display data processing instruction contained in the display instruction, stores the display data in one of the plurality of video buffers, carries out a video buffer switching process to select one of the plurality of video buffers based on the video buffer switching instruction contained in the display instruction, and outputs the display data from the selected video buffer. The display sync signal processing unit determines that a fault has occurred in any of the plurality of display processing units, when the display sync signal indicates that any of the plurality of display processing units does not acknowledge the video buffer switching instruction during a predetermined time, and outputs a display switching instruction. The vertical synchronization signal generating unit generates a vertical sync signal. The display switching unit selects one of the plurality of display processing units in synchronism with the vertical sync signal in a normal state, selects one of the plurality of display processing units which output the error flags, in synchronism with the vertical sync signal in response to the display switching instruction and outputs the display data from the selected display processing unit to the display unit. Thus, the display unit displays the display data.

In this case, the display sync signal processing unit may include a counter and a reference counter. The counter is counted up in synchronism with the vertical sync signal, when the display sync signal indicates that the other display processing unit does not acknowledge the video buffer switching instruction during the predetermined time. A predetermined value is set in the reference counter. The display sync signal processing unit determines based on the comparison result of the value of the reference counter and the value of the counter whether the predetermined time passed.

BRIEF DESCRIPTION OF THE DRAWINGS

FIGS. 3A to 3I are time charts to show an operation example of the display apparatus according to the first embodiment of the present invention;

FIGS. 4A to 4K are time charts to show another operation example of the display apparatus according to the first embodiment of the present invention;

DESCRIPTION OF THE PREFERRED EMBODIMENTS

Hereinafter, a display apparatus of the present invention will be described with reference to attached drawings.

(First embodiment)

Figure 1:
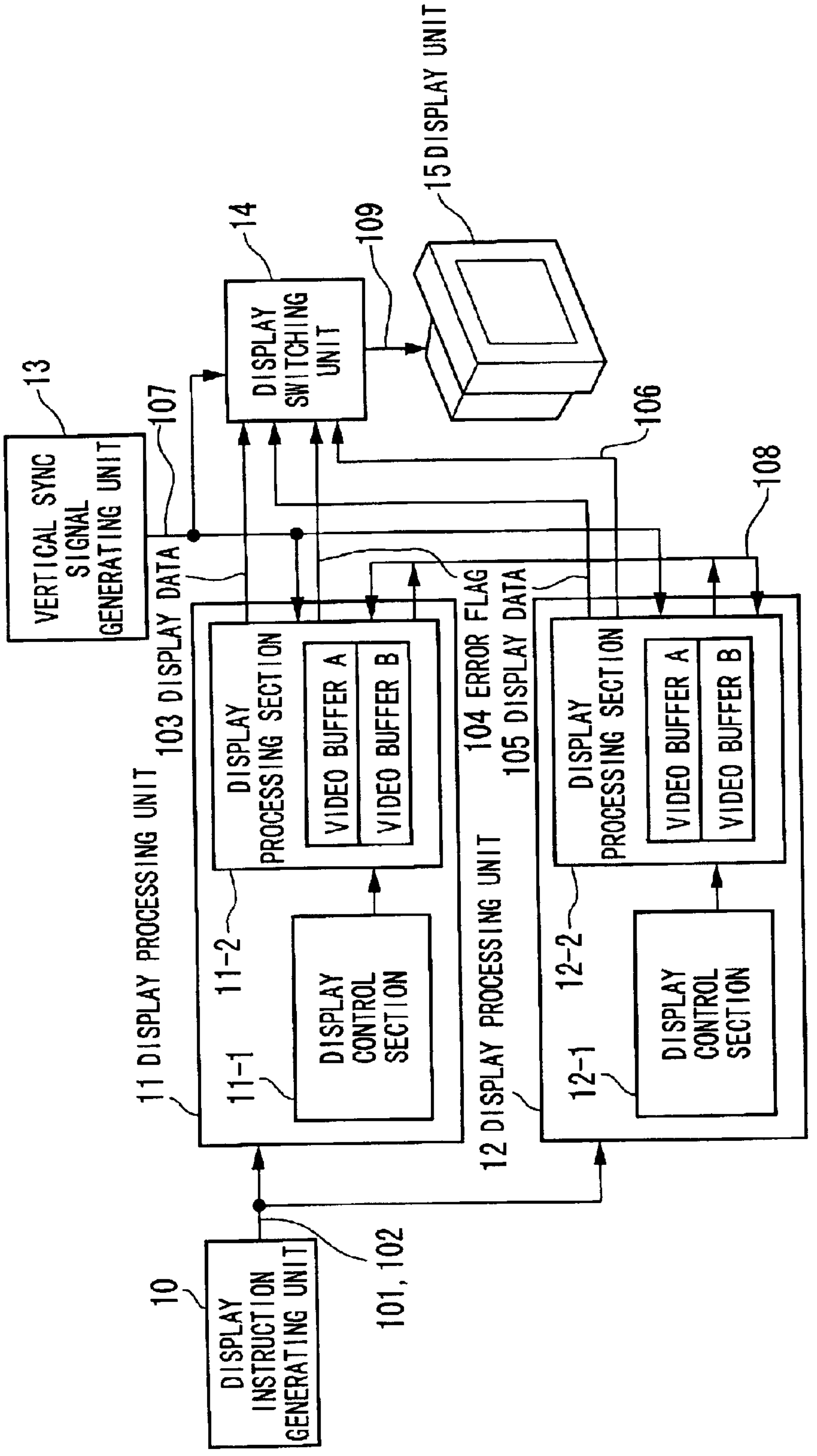
FIG. 1 is a block diagram showing the circuit configuration of a display apparatus according to a first embodiment of the present invention.

FIG. 1 is a diagram showing the display apparatus of the first embodiment of the present invention. As shown in FIG. 1, the display apparatus in the first embodiment is comprised of a display instruction generating unit 10, a display processing unit 11 of a display control unit 11-1 and a display processing section 11-2, a display processing unit 12 of a display control unit 12-1 and a display processing section 12-2, a vertical sync signal generating unit 13, a display switching unit 14 and a display unit 15.

The display instruction generating unit 10 issues a display instruction of a display data processing instruction 101 and a video buffer switching instruction 102 to the display processing units 11 and 12.

The display control units 11-1 and 12-1 in the display processing units 11 and 12 transfer the display data processing instructions 101 and the video buffer switching instructions 102 from the display instruction generating units 10 to the display processing sections 11-2 and 12-2, respectively.

The display processing sections 11-2 and 12-2 of the display processing units 11 and 12 carry out a display data generating process to generate display data and to store the display data in the video buffer A or B in response to the display data processing instructions 101 from the display control units 11-1 and 12-1, respectively. Also, the display processing sections 11-2 and 12-2 carry out a video buffer switching process to switch the video buffer which outputs display data 103 and 105 to the display switching unit 14 between the video buffers A and B in response to the video buffer switching instructions 102 from the display control units 11-1 and 12-1, respectively. At this time, the display processing sections 11-2 and 12-2 establish the synchronization of the video buffer switching process with a vertical sync signal 107 from the vertical sync signal generating unit 13, based on a display sync signal 108 which connects between the display processing units 11 and 12. The display sync signal 108 is a signal used to determine whether both of the display processing units 11 and 12 operate normally and the units 11 and 12 acknowledge the video buffer switching instruction 102. The detailed description of the display sync signal 108 will be made later.

Also, each of the display processing sections 11-2 and 12-2 determines that some fault has occurred in another display processing unit when the display sync signal 108 indicates the fact that the other display processing unit does not acknowledge the video buffer switching instruction 102 during a predetermined time, and outputs an error flag 104 or 106 to the display switching unit 14 to notify the fact.

The display switching unit 14 determines based on the error flags 104 and 106 from the display processing section 11-2 or 12-2, whether the fault has occurred in the display processing unit 11 or 12, and carries out a switching process of the display processing unit in which the fault has occurred. At this time, the display switching unit 14 establishes the synchronization of the switching process of the display processing unit with the vertical sync signal 107 from the vertical generating unit 13. Then, the display switching unit 14 outputs the display data from the switched one of the display processing units 11 and 12 to the display unit 15 as display data 109. The display data 109 is displayed on the screen of the display unit 15.

Here, it is supposed that some fault occurs in the display processing unit 11 and only the display processing unit 12 operates normally, and the display processing unit 11 is selected by the display switching unit 14 at present. In this case, the display processing unit 12 sets-the error flag 106 to "1", when determining based on the display sync signal 108 that the video buffer switching instruction 102 is not acknowledged by the display processing unit 11 during the predetermined time. On the other hand, the display processing unit 11 keeps the error flag 104 of "0" due to the fault occurrence.

Then, the display switching unit 14 determines that the fault has occurred in the display processing unit 11 and automatically switches the display processing unit which outputs the display data to the display unit 15, from the display processing unit 11 to the display processing unit 12.

Next, the structure of the display processing units 11 and 12 will be described in detail with reference to FIG. 2, FIGS. 3A to 3I and 4A to 4K. It should be noted that in the following description, the structure of the display processing unit 12 will be described for simplification of the description. However, the display processing unit 11 has the same structure.

Figure 2:
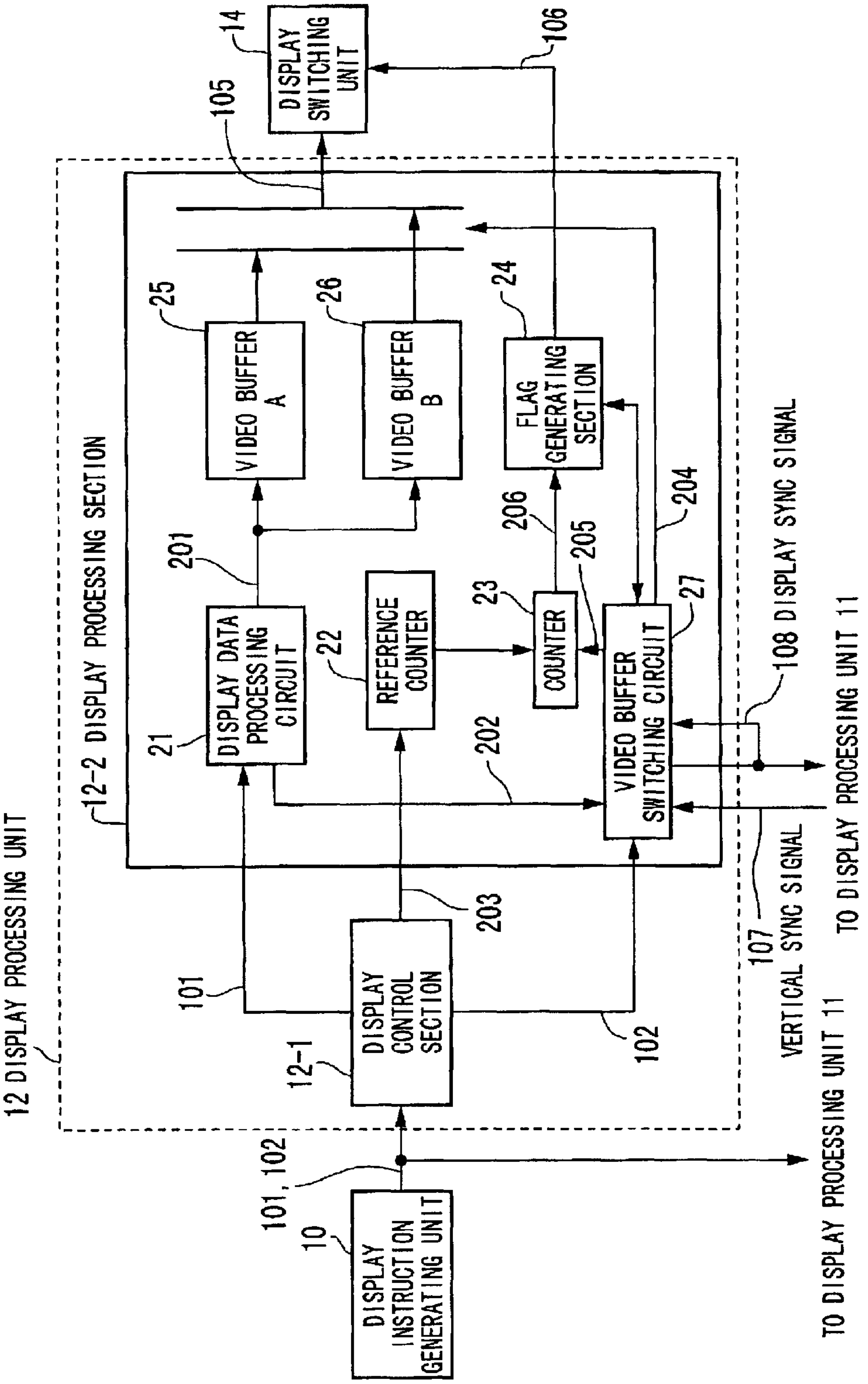
FIG. 2 is a block diagram showing the circuit configuration of a display processing unit in the display apparatus according to the first embodiment of the present invention.

FIG. 2 is a diagram showing the structure of the display processing unit 12 shown in FIG. 1. Referring to FIG. 2, the display processing unit 12 is comprised of a display control unit 12-1 and a display processing section 12-2 which is comprised of a display data processing circuit 21, a reference counter 22, a counter 23, a flag generating section 24, the video buffers (A) 25 and (B) 26, a video buffer switching circuit 27, and a selector.

The display control unit 12-1 transfers the display data processing instruction 101 from the display instruction generating unit 10 to the display data processing circuit 21 and transfers the video buffer switching instruction 102 from the display instruction generating unit 10 to the video buffer switching circuit 27. It should be noted that in a usual operation, the display control unit 12-1 transfer the display data processing instruction 101 to the display data processing circuit 21 and then transfers the video buffer switching instruction 102 to the video buffer switching circuit 21.

The display data processing circuit 21 carries out a display data generating process to generate the display data 201 and to store the display data in the video buffer 25 or 26 in response to the display data processing instruction 101 from the display control unit 12-1. The display data processing circuit 21 transmits a notice signal 202 to the video buffer switching circuit 27 during the display data generating process to notify the execution of the display data generating process.

The video buffer switching circuit 27 issues the video buffer switching instruction 204 when acknowledging the video buffer switching instruction 102 from the display control unit 12-1, and carries out the video buffer switching process to switch the video buffer which outputs the display data 105 to the display switching unit 14, into one of the video buffers 25 and 26. Also, the video buffer switching circuit 27 sets the control signal to "1" to control the display sync signal 108, when acknowledging the video buffer switching instruction 102 from the display control unit 12-1.

The display sync signal 108 is obtained by taking wired OR of signals sent out from the video buffer switching circuits 27 of the display processing sections 11-2 and 12-2. Therefore, when the display processing units 11 and 12 operate normally and acknowledge the video buffer switching instruction 102, the display sync signal 108 is set to "1". However, when a fault has occurred in the display processing unit 11 or 12 and the display processing unit in which the fault has occurred cannot acknowledge the video buffer switching instruction 102, the display sync signal 108 is set to "0". It should be noted that the display sync signal 108 is supplied to each of the video buffer switching circuits 27 of the display processing section 11-2 and 12-2.

The timing that the video buffer switching circuit 27 carries out the switching between the video buffers 25 and 26 is determined based on the notice signal 202 from the display data processing circuit 21, the vertical sync signal 107 and the display sync signal 108. Specifically, as shown in FIGS. 3A to 3I, the video buffer switching circuit 27 carries out the switching between the video buffers 25 and 26 while the vertical sync signal 107 is "0", or during no display, when it is determined based on the display sync signal 108 that the display processing sections 11-2 and 12-2 acknowledged the video buffer switching instruction 102 together after it is detected based on the notice signal 202 from the display data processing circuit 21 that the display data generating process is completed.

Also, when the video buffer switching circuit 27 detects the rising edge of the vertical sync signal 107, and then the video buffer switching circuit 27 issues a count instruction 205 in such a manner that the counter 23 is counted up. The counter 23 is reset when either of the conditions is met that the display sync signal 108 is in "1" (Not Busy state) when the vertical sync signal 107 is in "0" (during no display) and that the video buffer switching instruction 204 is issued from the switching circuit 27.

Therefore, the video buffer switching circuit 27 issues the count instruction to the counter 23 every time it detects the rising edge of the vertical sync signal 511, while the display sync signal 107 is in "0" (Busy state), that is, while another display processing unit (the display processing unit 11 in this example) in the fault state. As a result, the value of the counter 23 continues to rise. When the value of the counter 23 exceeds the value of the reference counter 22, a flag set signal 206 is outputted from the counter 23 to the flag generating section 24 to set the error flag 106 to "1". It should be noted that the value of reference counter 22 can be set in accordance with a reference counter setting instruction 203 from the display control unit 12-1, and is determined based on the delay time of the data transfer from the display instruction generating unit 10 to the display processing units 11 and 12 and the influence to the data to be displayed on the display unit 15 and so on.

Here, it is supposed that any fault occurs in the display processing unit 11 and only the display processing unit 12-operates normally. It should be noted that in this case, the display processing unit 11 is supposed to be selected by the display switching unit 14. In this case, because the display processing section 12-2 operates normally, the display processing section 12-2 acknowledges the video buffer switching instruction 102 from the display processing section 12-1, and set the display sync signal 108 to "1" (the Not Busy state). On the other hand, the display processing section 11-2 cannot acknowledge the video buffer switching instruction 102 due to the fault and the display sync signal 108 is remained in "0" (the Busy state). From now, in the display processing section 12-2, the video buffer switching circuit 27 drives the counter 23 to count up every time the video buffer switching circuit 27 detects the rising edge of the vertical sync signal 107. On the other hand, in the display processing section 11-2, the video buffer switching circuit 27 cannot drive the counter 23 to count up because of the fault occurrence. Therefore, only the value of the counter 23 in the display processing section 12-2 continues to rise.

After that, when the value of the counter 23 in the display processing section 12-2 exceeds the value of the reference counter 22, the error flag 106 (initial value is "0") of the display processing section 12-2 is set to "1". On the other hand, the display processing unit 11 keeps the error flag 104 of "0" due to the fault occurrence.

Then, the display switching unit 14 determines that the fault has occurred in the display processing unit 11, and automatically switches the display processing unit which outputs the display data to the display unit 15, from the display processing unit 11 to the display processing unit 12.

The operation of the display apparatus shown in FIG. 1 and FIG. 2 below will be described.

First, the operation when the display processing units 11 and 12 operate normally will be described using the time chart of FIGS. 3A to 3I. FIGS. 3A to 3I are time charts showing an example of the operation of the display apparatus shown in FIG. 1 and FIG. 2. The operation example when the display processing units 11 and 12 operate normally together is shown.

At time T301, the display processing sections 11-2 and 12-2 select the video buffers (A) 25 and output the display data stored in the video buffers (A) 25 as the display data 103 and 105, respectively.

Also, at time T301, when the display processing sections 11-2 and 12-2 detect the rising edge of the vertical sync signal 107, the display processing sections 11-2 and 12-2 set the display sync signal 108 to "0" (Busy state). Through this setting operation, the display sync signal 108 obtained by taking wired OR of signals outputted from the display processing sections 11-2 and 12-2 is set to "0". It should be noted that the display sync signal 108 is set to "1" (Not Busy state) by the pull-up resistor in the state of non-zero. In this example, the display control units 11-1 and 12-1 issue as the display instruction, the display data processing instruction 101-1 to the video buffer (B) 26, and the video buffer switching instruction 102-1 from the video buffer (A) 25 to the video buffer (B) 26, and the display data processing instruction 101-1 to the video buffer (A) 25 to the display processing sections 11-2 and 12-2 in this order.

When the display processing sections 11-2 and 12-2 receive the above-mentioned display instructions from the display control units 11-1 and 12-1, the display processing sections 11-2 and 12-2 first carry out the display data processing instruction 101-1 to the video buffer (B) 26. In this case, it is supposed that the display data generating process times in the display processing sections 11-2 and 12-2 are different due to a difference of the delay time of the data transfer from the display instruction generating unit 10 to the display processing units 11 and 12 during time T301 to time T302, and the display processing section 11-2 ends the display data processing instruction 101-1 earlier than the display processing section 12-2, and acknowledged the video buffer switching instruction 102-1.

Subsequently, at time T302, the display processing section 11-2 stops driving the display sync signal 108 to "0", when detecting the falling edge of the vertical sync signal 107. On the other hand, the display processing section 12-2 is on execution of the display data processing instruction 101-1 and does not acknowledge the video buffer switching instruction 102. Therefore, the display sync signal 108 is remained in "0". Thus, at this time point, the display sync signal 108 remains set to "0", and the video buffer switching instruction 102-1 is not carried out.

After that, during time T302 to time T303, when the display processing section 12-2 ends the execution of the display data processing instruction 101-1, the display processing sections 11-2 and 12-2 enter an execution wait state of the video buffer switching instruction 102-2 together.

Subsequently, at time T303, the display processing sections 11-2 and 12-2 stops the driving the display sync signal 108 to "0", when detecting the falling edge of the vertical sync signal 107, and the display sync signal 108 is set to "1".

Therefore, during time T303 to time T304, the display processing sections 11-2 and 12-2 issue the video buffer switching instruction 204 to switch the video buffer from the video buffer (A) 25 to the video buffer (B) 26.

After that, the display processing sections 11-2 and 12-2 start the execution of the display data processing instruction 101-2 to the video buffer (A) 25.

Next, the operation when a fault occurs in the display processing unit 11 and only the display processing unit 12 is operate normally will be described with reference to the time chart of FIGS. 4A to 4K. It should be noted that the display processing unit 11 is supposed to be selected by the display switching unit 14. FIGS. 4A to 4K are time charts showing another example of the operation of the display apparatus shown in FIG. 1 and FIG. 2, and shows an operation example when the fault occurs in the display processing unit 11 and only the display processing unit 12 is operate normally. It should be noted that in this example, like the example of FIGS. 3A to 3I, the display control units 11-1 and 12-1 issue the display data processing instruction 101-1 to the video buffer (B) 26, the video buffer switching instruction 102-1 from the video buffer (A) 25 to the video buffer (B) 26, and the display data processing instruction 101-1 to the video buffer (A) 25 to the display processing sections 11-2 and 12-2 in this order.

During time T400 to time T401, the display processing section 12-2 ends the execution of the display data processing instruction 101-1 and enters the execution wait state of the video buffer switching instruction 102-1. Therefore, the display processing section 12-2 acknowledges the video buffer switching instruction 102-1, stops driving the display sync signal 108 to "0" (Busy state) and sets it to "1" (Not Busy state). On the other hand, the display processing section 11-1 cannot acknowledge the video buffer switching instruction 102-1 because of the fault occurred in the display processing unit 11, and the display sync signal 108 remains in "0". Thus, the display switching signal 108 remains driven to "0".

Subsequently, at times T401, T402 and T403, the display processing section 12-2 counts up the counter 23 in the display processing section 12-2, every time the display processing section 12-2 detects the rising edge of the vertical sync signal 107. On the other hand, the display processing section 11-2 cannot count up the counter 23 in the display processing section 11-2, because of the fault in the display processing unit 11. Therefore, only the value of the counter 23 in the display processing section 12-2 continues to rise.

Subsequently, at time T403, when the value of the counter 23 in the display processing section 12-2 exceeds the value of reference counter 22 in the display processing section 12-2, the display processing section 12-2 sets the error flag 106 (initial value is "0") to "1" (Error). On the other hand, the error flag 104 to the display processing section 11-2 remains in "0".

Subsequently, at time T404, the display processing section 12-2 issues the video buffer switching instruction 204 compulsorily and switches from the video buffer (A) 25 to the video buffer (B) 26, when it is confirmed that the error flag 106 of the display processing section 12-2 has been set to "1" in case of detection of the rising edge of the vertical sync signal 107. The counter 23 in the display processing section 12-2 is reset to "0" when the video buffer switching instruction 204 is issued. It should be noted that the display processing section 12-2 carries out the video buffer switching instruction 102-1 irrespective of the polarity of the display sync signal 108 while the error flag 106 is "1".

The display switching unit 14 determines that the fault has occurred in the display processing unit 11, when detecting that only the error flag 106 from the display processing section 12-2 is set to "1", and switches the display processing unit, which outputs the display data to the display unit 15, from the display processing unit 11 to the display processing unit 12.

After that, the display processing section 12-2 starts the execution of the display data processing instruction 101-2 to the video buffer (B) 25.

It should be noted that in this embodiment, the structure of the display apparatus using the two display processing units is described. However, the present invention is not limited to this structure. The display apparatus of the present invention can be built by using two or more of the display processing units.

(Second Embodiment)

Figure 5:
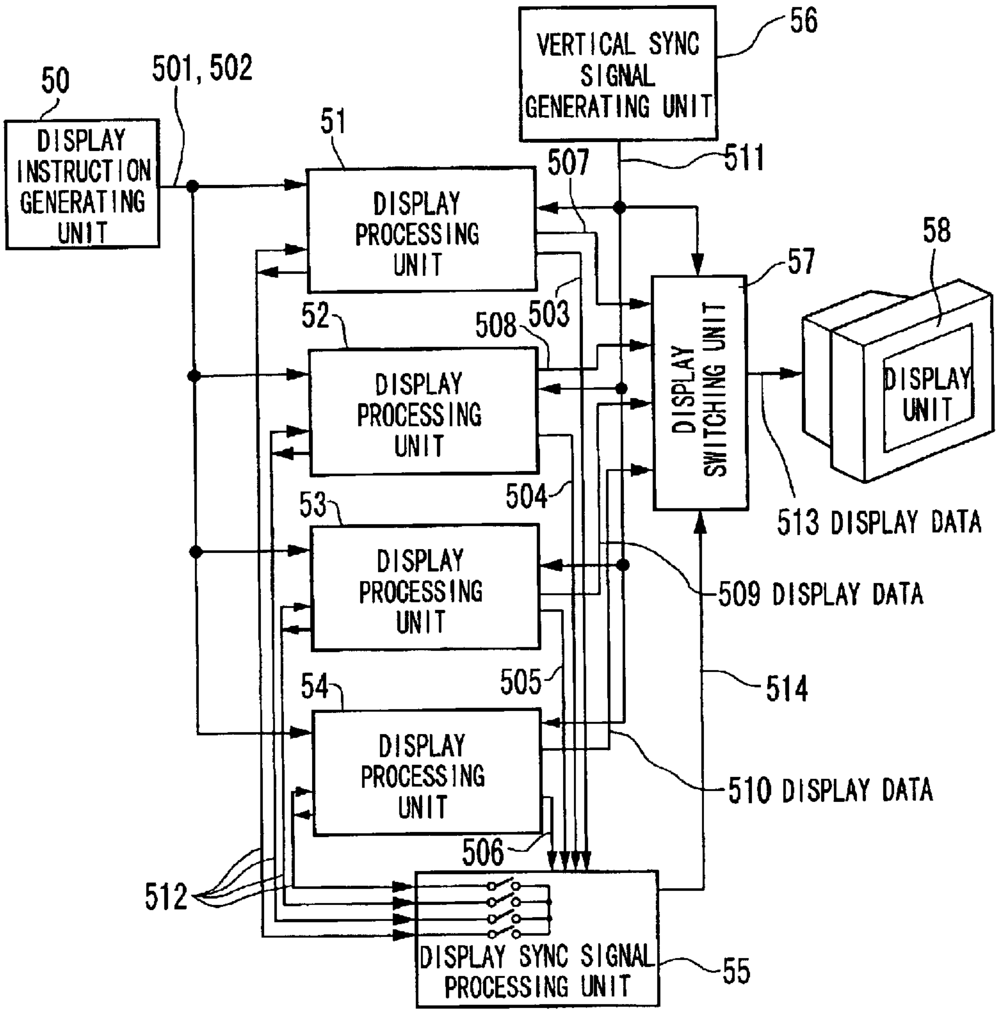
FIG. 5 is a block diagram showing the circuit configuration of the display apparatus according to a second embodiment of the present invention.

FIG. 5 is a diagram showing the display apparatus according to the second embodiment of the present invention. As shown in FIG. 5, in this embodiment, the display apparatus is comprised of a display instruction generating unit 50, display processing units 51 to 54, a display sync signal processing unit 55, a vertical sync signal generating unit 56, a display switching unit 57 and a display unit 58.

The display instruction generating unit 50 issues a display data processing instruction 501 and a video buffer switching instruction 502 to the display processing units 51 to 54.

The display processing units 51 to 54 carry out the display data generating process to generate the display data and to store the display data in the video buffer (not shown) when acknowledging the display data processing instruction 501 from the display instruction generating unit 50, respectively. Also, the display processing units 51 to 54 carry out the video buffer switching process for switching the above-mentioned video buffer, when acknowledging the video buffer switching instruction 502 from the display instruction generating unit 50, respectively. It should be noted that the display processing units 51 to 54 establish the synchronization of the video buffer switching process with the vertical sync signal 511 from the vertical generating unit 56, in response to the display sync signal 512 which connects between the display processing units 51 to 54, respectively. Also, the display processing units 51 to 54 output the display data, which are stored in the video buffer switched by the above-mentioned video buffer switching process, to the display switching unit 57 as the display data 507 to 510, respectively.

It should be noted that the display data generating process and the video buffer switching process which are carried out in the display processing units 51 to 54 are the same as the display data generating process and the video buffer switching process which are carried out in the display processing units 11 and 12 shown in FIG. 1 and FIG. 2. Therefore, the description is omitted.

Also, the display processing units 51 to 54 sets the display sync signal 512 to "1", when acknowledging the video buffer switching instruction 502 from the display instruction generating unit 50. It should be noted that the wired OR result of the signals outputted from the display processing units 51 to 54 is the display sync signal 512, and the display sync signal 512 is supplied to the display processing units 51 to 54, like the display apparatus shown in FIG. 1.

Also, the display processing units 51 to 54 determine the fact that some fault has occurred in another display processing unit, when it is confirmed based on the display sync signal 512 that the other display processing unit does not acknowledge the video buffer switching instruction 502 during the predetermined time, and output the error flags 503 to 506 to notify the fact to the display sync signal processing unit 55, respectively. It should be noted that each of the display processing units 51 to 54 is comprised of a counter (not shown) and a reference counter (not shown) and determines based on the comparison result of the value of the counter and the value of the reference counter whether the predetermined time has passed.

The display sync signal processing unit 55 determines based on the error flags 503 to 506 from the display processing units 51 to 54 whether the fault has occurred in the display processing units 51 to 54, and issues the display switching instruction 514 to the display switching unit 57 such that the switching of the display processing unit in which the fault has occurred is carried out.

Also, the display sync signal processing unit 55 is comprised of switches to carry out the connection and disconnection of the display sync signal 512 to the display processing units 51 to 54, and by the switch, the connection of the display sync signal 512 to the display processing unit in which the fault has occurred is disconnected.

The display switching unit 57 switches the display processing unit, which outputs the display data to the display unit 58, to either of the display processing units 51 to 54 based on the display switching instruction 514 from the display sync signal processing unit 55. It should be noted that the display switching unit 57 establishes the synchronization of the switching of the display processing unit with the vertical sync signal 511 from the vertical generating unit 56. Also, the display switching unit 57 outputs the display data from the switched display processing unit of the display processing units 51 to 54 to the display unit 58 as the display data 513. Thus, the display data is displayed on the screen of the display unit 58.

Here, it is supposed that some fault occurs in the display processing unit 51 and the display processing units 52 to 54 operate normally. It should be noted that the display processing unit 51 is supposed to be selected by the display switching unit 57. In this case, the error flags 504 to 506 of the display processing units 52 to 54 are set to "1" and supplied to the display sync signal processing unit 55. On the other hand, the error flag 503 of the display processing unit 51 remains in "0".

Then, the display sync signal processing unit 55 determines that some fault has occurred in the display processing unit 51 because only the error flag 503 of the display processing unit 51 is not "1", and disconnects the connection of the display sync signal 512 to the display processing unit 51 by the switch. Simultaneously with this, the display sync signal processing unit 55 issues the display unit switching instruction 514 to the display switching unit 57 to switch the display processing unit, which outputs the display data to the display unit 58, from the display processing unit 51 to the display processing unit 52. It should be noted that when the display unit switching instruction 514 is issued, the error flags 504 to 506 of the display processing units 52 to 54 are reset to "0". Also, simultaneously, the display sync signal processing unit 55 uses an emitting light unit such as a lamp (not shown) to notify that the fault has occurred in the display processing unit 51.

In this way, when some fault occurs in either of the display processing units 52 to 54, the display sync signal processing unit 55 detects the error flags 504 to 506 of the display processing units 52 to 54, disconnects the connection of the display sync signal 512 to the display processing unit in which the fault has occurred, and displays the display processing unit in which the fault has occurred by the lamp. At the same time, the display sync signal processing unit 55 issues the display unit switching instruction 514 to the display switching unit 57 to instruct the display processing unit in which the fault has occurred to be switched. It should be noted that in this embodiment, the structure of the display apparatus using the four display processing units is described. However, the present invention is not limited. This apparatus is possible to be built by using two or more of the display processing units.

(Third Embodiment)

Figure 6:
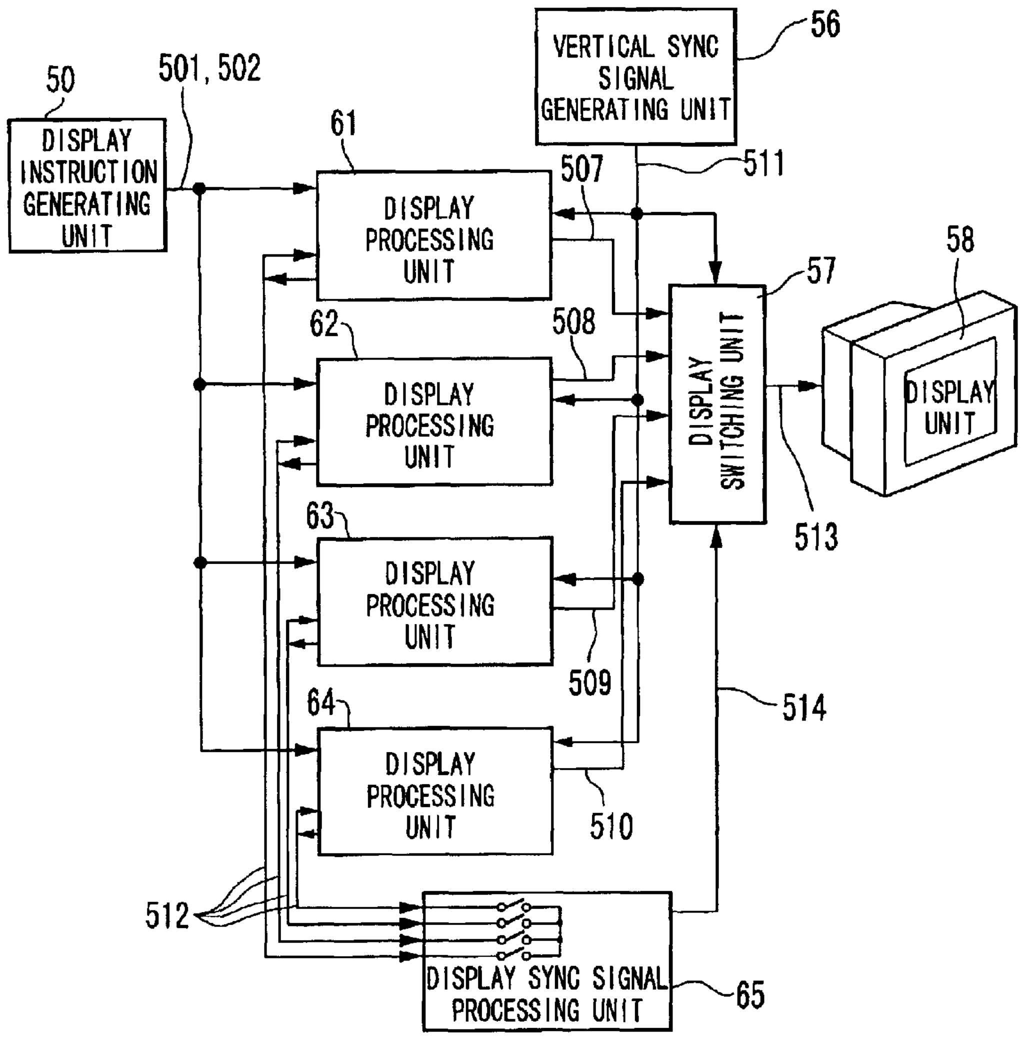
FIG. 6 is a block diagram showing the circuit configuration of the display apparatus according to a third embodiment of the present invention.

FIG. 6 is a diagram showing the display apparatus according to the third embodiment of the present invention. As shown in FIG. 6, the display apparatus in this embodiment is different from the display apparatus of FIG. 5 in the point that the error flag processing using the counter and the reference counter is carried out in not the display processing units 61 to 64 but the display sync signal processing unit 65. It should be noted that in FIG. 6, the same components as those of the display apparatus of FIG. 5 are allocated with the same reference numerals or symbols and the description is omitted.

The display processing units 61 to 64 does not have the counter and the reference counter, and does not carry out the error flag processing, but has the same structure as the display processing units 51 to 54 of FIG. 5, except for the above.

Figure 7:
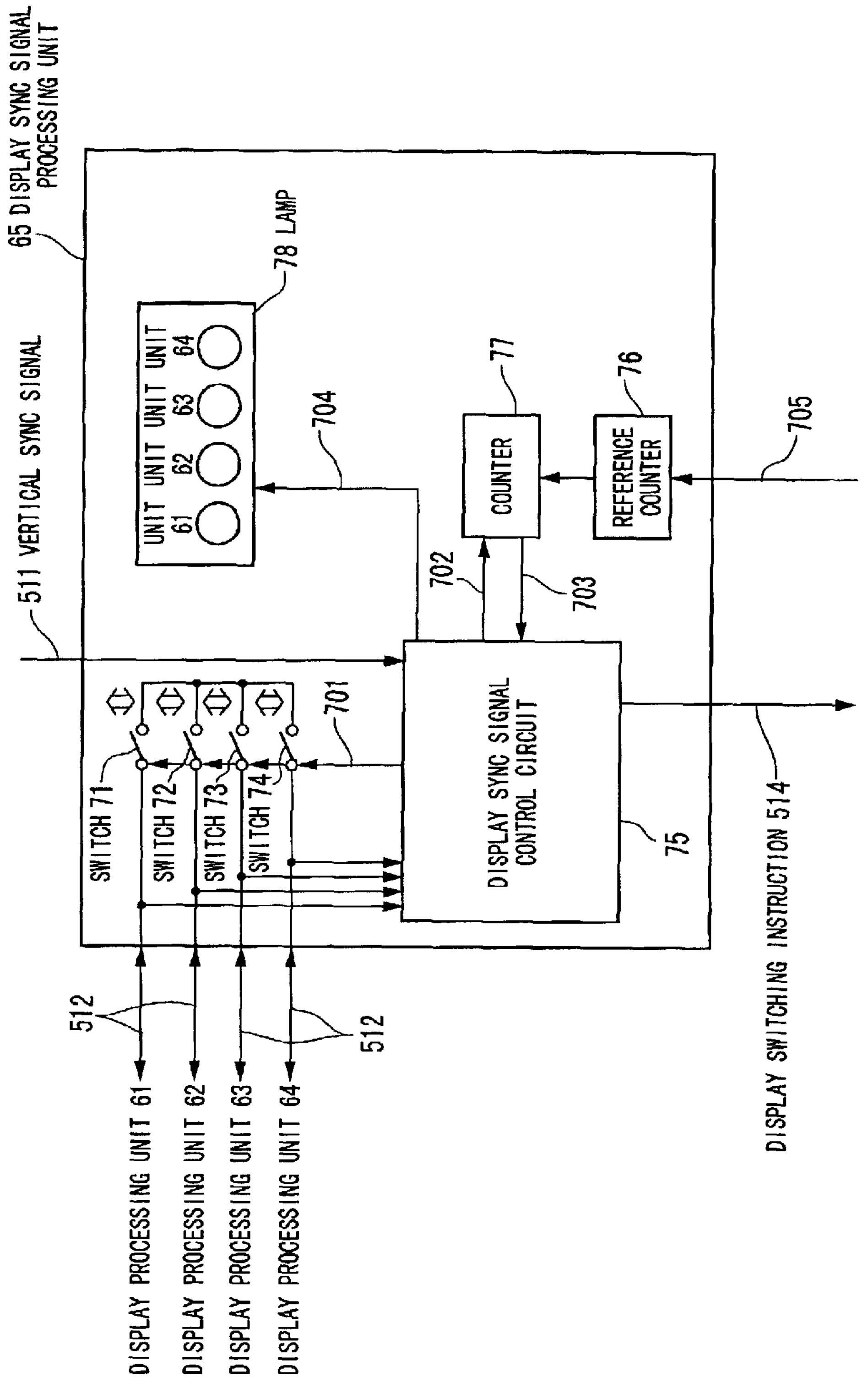
FIG. 7 is a diagram showing a structural example of a display sync signal processing unit shown in FIG. 6.

Here, the structure of the display sync signal processing unit 65 will be described with reference to FIG. 7. FIG. 7 is a diagram showing a structural example of the display sync signal processing unit 65 shown in FIG. 6.

As shown in FIG. 7, the display sync signal processing unit 65 is comprised of switches 71 to 74, a display sync signal control circuit 75, a reference counter 76, a counter 77 and a lamp 78.

The switches 71 to 74 are used to control the connection or disconnection of the display sync signal 512 to the display processing units 61 to 64.

The display sync signal control circuit 75 inputs control signals to control the display sync signal 512 from each of the display processing units 61 to 64 and supplies the wired OR result of these control signals to the display processing units 61 to 64 as the display sync signal 512. Also, the display sync signal control circuit 75 issues a switching instruction 701 to control the switches 71 to 74. It should be noted that the switches 71 to 74 are disconnected while the vertical sync signal 511 is "1" (display). Generally, while the vertical sync signal 511 is "1", the display sync signal 512 is "0" (Busy state). Also, the display sync signal control circuit 75 issues a count instruction 702 to count up the counter 77, when detecting the rising edge of the vertical sync signal 511.

It should be noted that the counter 77 is reset when the conditions are met that the display sync signal 512 is "1" (Not Busy state) when the vertical sync signal 511 is "0" (no display) and that the display unit switching instruction 514 is issued.

Therefore, the counter 77 is counted up each time the rising edge of the vertical sync signal 511 is detected, while the display sync signal 512 is "0", i.e., while the fault occurs in either of the display processing units 61 to 64. As a result, the value of the counter 77 continues to rise. When the value of the counter 77 exceeds the value of the reference counter 76, the error detection signal 703 is transmitted from the counter 77 to the display sync signal control circuit 75. It should be noted that it is possible to set the value of reference counter 76 in accordance with a reference counter setting instruction 705 from the external (, e.g. the display processing units 61 to 64).

The display sync signal control circuit 75 determines that some fault has occurred in any of the display processing units 61 to 64, when acknowledging the error detection signal 703 from the counter 77, and disconnects the connection of the display sync signal 512 to the display processing unit in which the fault has occurred. Also, simultaneously with this, a lamp turn-on instruction 704 is issued to the lamp 78, and the display processing unit, in which the fault has occurred, is notified with the lamp 78. Also, at the same time, the display sync signal control circuit 75 issues the display unit switching instruction 514 to switch the display processing unit to the display switching unit 57.

Here, it is supposed that some fault occurs in the display processing unit 61 and the display processing units 62 to 64 operate normally. It should be noted that the display processing unit 61 is supposed to be selected by the display switching unit 57. In this case, the display processing units 62 to 64 operate normally, acknowledges the video buffer switching instruction 502 and the control signal to control the display sync signal 512 is set to "1" (Not Busy state). On the other hand, the display processing unit 61 cannot acknowledge the video buffer switching instruction 502 because of the fault occurrence and the control signal to control the display sync signal 512 is set to "0" (Busy state). With this, the display sync signal 512 is set to "0".

Subsequently, the display sync signal control circuit 75 counts up the counter 77 each time detecting the rising edge of the vertical sync signal 511. At this time, the display sync signal 512 remains being as "0", and the counter 77 is not reset. As a result, the value of the counter 77 continues to rise.

After that, when the value of the counter 77 exceeds the value of the reference counter 76, an error detection signal 703 is transmitted from the counter 77 to the display sync signal control circuit 75.

Then, the display sync signal control circuit 75 determines that some fault has occurred in the display processing unit 61, and disconnects the connection of the display sync signal 512 to the display processing unit 61 regardless of the polarity of the vertical sync signal 511. Simultaneously with this, the display sync signal control circuit 75 issues a lamp turn-on instruction 617 to the lamp 78 to notify by the lamp 78 that the display processing unit 61 is broke down. Also, simultaneously with this, the display sync signal control circuit 75 issues the display unit switching instruction 514 to the display switching unit 57 to switch the display processing unit which outputs the display data to the display unit 58, from the display processing unit 61 to the display processing unit 62.

By this, the display sync signal 512 to be supplied to the display processing unit 61 is disconnected by the switch 71, and only the display sync signal 512 to the display processing units 62 to 64 is connected with the display sync signal control circuit 75. At this time, because the control signals of the display processing units 62 to 64 are "1", the display sync signal 512 is set to "1". Therefore, in the display processing units 62 to 64, the video buffer switching process is carried out like a usual manner, while the vertical sync signal 511 is "1" (no display).

It should be noted that in this embodiment, the structure of the display apparatus using the four display processing units is described. However, the present invention is not limited to this structure. This apparatus can be built by using two or more of the display processing units.

As described above, according to the display apparatus of the present invention, one or more display processing units are provided to output the display data to the display unit. Therefore, the display processing unit in which the fault has occurred can be switched to another display processing unit, even when the fault occurs in the display processing unit which outputs the display data in real time.

Also, the display switching unit is provided to switch the display processing units. Therefore, the operator does not need to manually switch the display processing unit, when the fault occurs in the display processing unit and the influence to the display quality can be reduced.

Also, the display processing unit determines that a fault has occurred in another display processing unit and sets an error flag, when it is confirmed based on the display sync signal that the other display processing unit does not acknowledge the video buffer switching instruction during a predetermined time. The display switching unit determines whether or not the fault has occurred in the display processing unit based on the error flag from the display processing unit. Therefore, the display processing unit in which the fault has occurred actually can be easily detected based on the error flag.

What is claimed is:

1. A display apparatus comprising:

a display unit;

a display instruction generating unit which outputs a display instruction;

a plurality of display processing units which are arranged in parallel and each of which generates display data in response to said display instruction from said display instruction generating unit; and a display switching unit which selects one of said plurality of display processing units and outputs said display data from said selected display processing unit to said display unit, wherein said display unit displays said display data;

wherein each of said plurality of display processing units comprises a plurality of video buffers, generates said display data in response to a display data processing instruction contained in said display instruction, stores said display data in one of said plurality of video buffers, carries out a video buffer switching process to select one of said plurality of video buffers based on said video buffer switching instruction contained in said display instruction and outputs said display data from said selected video buffer to said display switching unit.

2. The display apparatus according to claim 1, wherein said plurality of display processing units are connected with a display sync signal, and each of plurality of display processing units determines based on said display sync signal whether all of said plurality of display processing units acknowledge said video buffer switching instruction.

3. The display apparatus according to claim 2, wherein each of said plurality of display processing units outputs an error flag when said display sync signal indicates that any of said plurality of display processing units does not acknowledge said video buffer display switching instruction during a predetermined time, and said display switching unit selects one of said display processing units which output said error flags, and outputs said display data from said selected display processing unit to said display unit.

4. The display apparatus according to claim 3, wherein said display processing unit carries out said video buffer switching process irrespective of the indication of said display sync signal, while outputting said error flag to said display switching unit.

5. The display apparatus according to claim 3, further comprising:

a vertical synchronization signal generating unit which generates a vertical sync signal, wherein said display switching unit selects one of said plurality of display processing units in synchronism with said vertical sync signal.

6. The display apparatus according to claim 5, wherein each of said plurality of display processing units comprises:

a counter which is counted up in synchronism with said vertical sync signal, when said display sync signal indicates that said another display processing unit does not acknowledge said video buffer switching instruction during the predetermined time; and a reference counter in which a predetermined value is set, and wherein said display processing unit determines based on the comparison result of the value of said reference counter and the value of said counter whether said predetermined time passed.

7. The display apparatus according to claim 2, wherein each of said plurality of display processing units outputs an error flag when said display sync signal indicates that any of said plurality of display processing units does not acknowledge said video buffer display switching instruction during a predetermined time, and said display apparatus further comprising:

a display sync signal processing unit which determines based on said error flags from said plurality of display processing units that a fault has occurred in any of said plurality of display processing units, and outputs a display switching instruction to said display switching unit, and said display switching unit selects one of said display processing units which output said error flags, and outputs said display data from said selected display processing unit to said display unit.

8. The display apparatus according to claim 7, wherein said display sync signal processing unit disconnects said display sync signal from the display processing unit in which the fault has occurred.

9. The display apparatus according to claim 7, wherein said display sync signal processing unit comprises:

light emitting devices which notify the display processing unit in which the fault has occurred.

10. The display apparatus according to claim 2, wherein said display processing units are connected with said display sync signal, and said display apparatus further comprises:

a display sync signal processing unit which determines that a fault has occurred in any of said plurality of display processing units, when said display sync signal indicates that any of said plurality of display processing units does not acknowledge said video buffer switching instruction during a predetermined time, and which outputs a display switching instruction to said display switching unit, and said display switching unit selects one of said display processing units which output said error flags, and outputs said display data from said selected display processing unit to said display unit.

11. The display apparatus according to claim 10, wherein said display sync signal processing unit disconnects said display sync signal from the display processing unit in which the fault has occurred.

12. The display apparatus according to claim 10, wherein said display sync signal processing unit comprises:

light emitting devices which notify the display processing unit in which the fault has occurred.

13. The display apparatus according to claim 10, further comprising:

a vertical synchronization signal generating unit which generates a vertical sync signal, wherein said display switching unit selects one of said plurality of display processing units in synchronism with said vertical sync signal.

14. The display apparatus according to claim 13, wherein said display sync signal processing unit comprises:

a counter which is counted up in synchronism with said vertical sync signal, when said display sync signal indicates that said another display processing unit does not acknowledge said video buffer switching instruction during the predetermined time; and a reference counter in which a predetermined value is set, and wherein said display sync signal processing unit determines based on the comparison result of the value of said reference counter and the value of said counter whether said predetermined time passed.

15. A display apparatus comprising:

a display unit;

a display instruction generating unit which outputs a display instruction;

a plurality of display processing units connected with a display sync signal, wherein each of said plurality of display processing units comprises a plurality of video buffers, generates said display data in response to a display data processing instruction contained in said display instruction, stores said display data in one of said plurality of video buffers, carries out a video buffer switching process to select one of said plurality of video buffers based on said video buffer switching instruction contained in said display instruction, outputs said display data from said selected video buffer, and outputs an error flag when said display sync signal indicates that any of said plurality of display processing units does not acknowledge said video buffer display switching instruction during a predetermined time;

a vertical synchronization signal generating unit which generates a vertical sync signal; and a display switching unit which selects one of said plurality of display processing units in synchronism with said vertical sync signal in a normal state, selects one of said plurality of display processing units outputting said error flags in synchronism with said vertical sync signal when it is determined from said error flags that a fault has occurred in any of said plurality of display processing units, and outputs said display data from said selected display processing unit to said display unit, wherein said display unit displays said display data.

16. The display apparatus according to claim 15, wherein each of said plurality of display processing units comprises:

a counter which is counted up in synchronism which said vertical sync signal, when said display sync signal indicates that said another display processing unit does not acknowledge said video buffer switching instruction during the predetermined time; and a reference counter in which a predetermined value is set, and wherein said display processing unit determines based on the comparison result of the value of said reference counter and the value of said counter whether said predetermined time passed.

17. A display apparatus comprising:

a display unit;

a display instruction generating unit which outputs a display instruction;

a plurality of display processing units connected with a display sync signal, wherein each of said plurality of display processing units comprises a plurality of video buffers, generates said display data in response to a display data processing instruction contained in said display instruction, stores said display data in one of said plurality of video buffers, carries out a video buffer switching process to select one of said plurality of video buffers based on said video buffer switching instruction contained in said display instruction, outputs said display data from said selected video buffer, and outputs an error flag when said display sync signal indicates that any of said plurality of display processing units does not acknowledge said video buffer display switching instruction during a predetermined time;

a display sync signal processing unit which determines based on said error flags from said plurality of display processing units that a fault has occurred in any of said plurality of display processing units, and outputs a display switching instruction to said display switching unit;

a vertical synchronization signal generating unit which generates a vertical sync signal; and a display switching unit which selects one of said plurality of display processing units in synchronism with said vertical sync signal in a normal state, selects one of said plurality of display processing units which output said error flags, in synchronism with said vertical sync signal in response to said display switching instruction and outputs said display data from said selected display processing unit to said display unit, wherein said display unit displays said display data.

18. The display apparatus according to claim 17, wherein each of said plurality of display processing units comprises:

a counter which is counted up in synchronism with said vertical sync signal, when said display sync signal indicates that said another display processing unit does not acknowledge said video buffer switching instruction during the predetermined time; and a reference counter in which a predetermined value is set, and wherein said display processing unit determines based on the comparison result of the value of said reference counter and the value of said counter whether said predetermined time passed.

19. A display apparatus comprising:

a display unit;

a display instruction generating unit which outputs a display instruction;

a plurality of display processing units connected with a display sync signal, wherein each of said plurality of display processing units comprises a plurality of video buffers, generates said display data in response to a display data processing instruction contained in said display instruction, stores said display data in one of said plurality of video buffers, carries out a video buffer switching process to select one of said plurality of video buffers based on said video buffer switching instruction contained in said display instruction, and outputs said display data from said selected video buffer;

a display sync signal processing unit which determines that a fault has occurred in any of said plurality of display processing units, when said display sync signal indicates that any of said plurality of display processing units does not acknowledge said video buffer switching instruction during a predetermined time, and which outputs a display switching instruction;

a vertical synchronization signal generating unit which generates a vertical sync signal; and a display switching unit which selects one of said plurality of display processing units in synchronism with said vertical sync signal in a normal state, selects one of said plurality of display processing units which output said error flags, in synchronism with said vertical sync signal in response to said display switching instruction and outputs said display data from said selected display processing unit to said display unit, wherein said display unit displays said display data.

20. The display apparatus according to claim 19, wherein said display sync signal processing unit comprises:

a counter which is counted up in synchronism with said vertical sync signal, when said display sync signal indicates that said another display processing unit does not acknowledge said video buffer switching instruction during the predetermined time; and a reference counter in which a predetermined value is set, and wherein said display sync signal processing unit determines based on the comparison result of the value of said reference counter and the value of said counter whether said predetermined time passed.

* * * * *